United States Patent [19]

Nishiguchi et al.

[11] Patent Number: 5,230,840
[45] Date of Patent: Jul. 27, 1993

[54] METHOD OF MANUFACTURING THERMOPLASTIC/RESIN MOLDED OPTICAL MEMBER

[75] Inventors: Masaki Nishiguchi; Yoshiaki Ohishi; Kazuo Chiba; Michio Yamaguchi, all of Tokyo, Japan

[73] Assignee: The Furukawa Electric Co., Ltd., Tokyo, Japan

[21] Appl. No.: 757,714

[22] Filed: Sep. 11, 1991

[30] Foreign Application Priority Data

Sep. 14, 1990 [JP] Japan ................................. 2-245433
Jul. 19, 1991 [JP] Japan ................................. 3-203754

[51] Int. Cl.$^5$ ............................................. B29D 11/00
[52] U.S. Cl. .................................... 264/1.5; 264/2.2; 264/2.3; 264/2.7; 264/85; 264/102; 264/338; 264/519
[58] Field of Search ..................... 264/1.1, 1.5, 2.6, 2.7, 264/85, 102, 519, 2.2, 2.3, 338

[56] References Cited

U.S. PATENT DOCUMENTS 4,571,313 2/1986 Allemand et al. ................... 264/1.5

FOREIGN PATENT DOCUMENTS 194817 11/1984 Japan ................................. 264/1.1

Primary Examiner—James Lowe
Attorney, Agent, or Firm—Frishauf, Holtz, Goodman & Woodward

[57] ABSTRACT

A method of manufacturing thermoplastic resin molded optical members comprising a thermoplastic resin material into a mold, defoaming thermoplastic resin material in vacuo at a specific temperature for causing the loaded thermoplastic resin material to melt and to flow, and producing a molded optical member by gradually cooling off the mold in the upward direction from the bottom side while pressurizing the interior of the mold with an inert gas. The inner surface of the mold is preferably preliminarily coated with a release material such as fluoroplastic containing either fluorinated alicyclic group or a fluorinated heterocyclic group in the main chain.

8 Claims, 4 Drawing Sheets

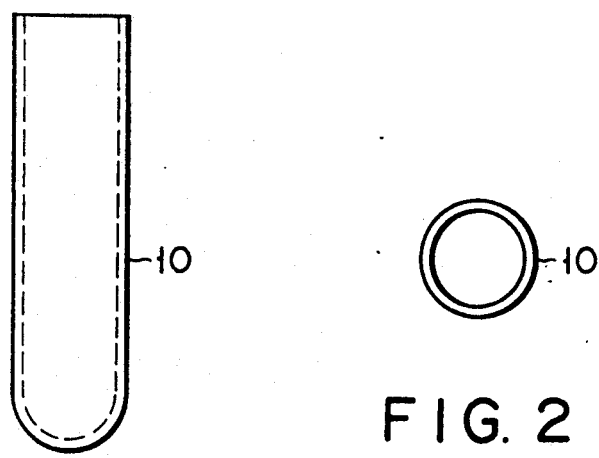
FIG. 1
FIG. 2
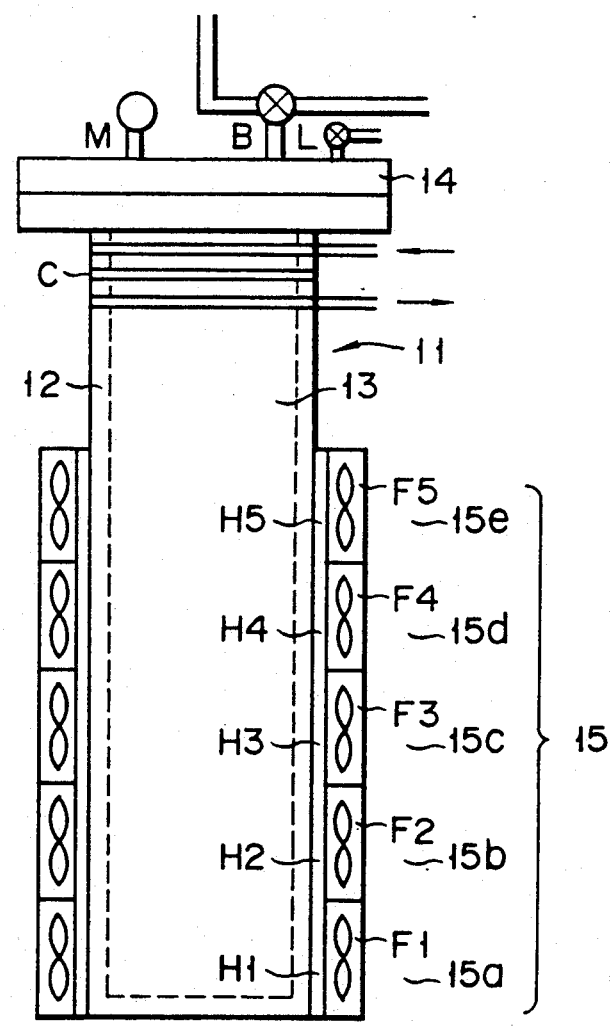
FIG. 3

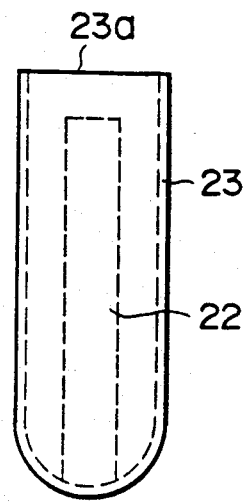 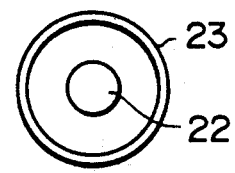
FIG. 10  FIG. 11
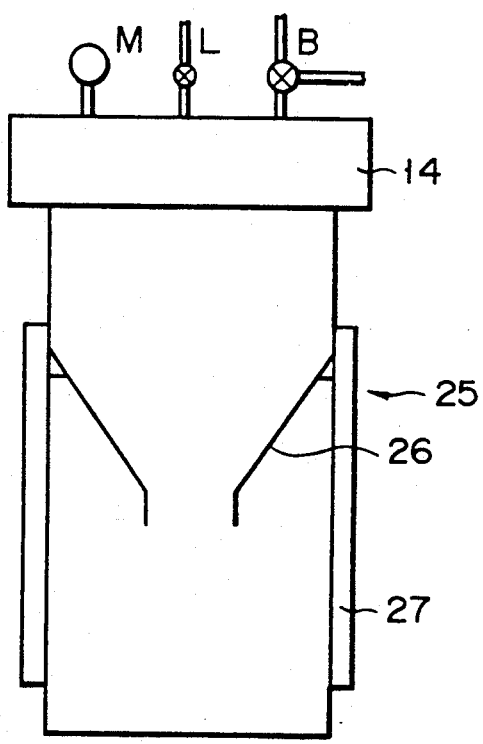
FIG. 12

METHOD OF MANUFACTURING THERMOPLASTIC/RESIN MOLDED OPTICAL MEMBER

BACKGROUND OF THE INVENTION

1. Field of the Invention

The present invention relates to a method of manufacturing thermoplastic resin molded optical members such as, for example, optical assembly members, preforms of plastic optical fibers, or light wave guides.

2. Description of the Related Art

Conventionally, according to the kinds of products to be molded, thermoplastic resin molded optical members such as optical assembly members, plastic optical fibers, or light wave guide members, are manufactured by executing either an extrusion molding process or an injection molding process. Nevertheless, all of these conventional methods of manufacturing such thermoplastic resin molded optical members still have a variety of technical problems to be solved.

When manufacturing molded optical members by using an extrusion molding process, normally, there are a number of grooves in the resin path of any extrusion molding machine to cause resin material to easily build up inside as a result of the movement of the screw of the molding machine. This in turn prevents resin material simultaneously delivered to the extrusion molding machine from a hopper from simultaneously being extruded. Part of the resin material adheres to the screw as a result of the occurrence of convection, resulting in depositing of resinous residue.

On the other hand, if a high temperature is used in the molding process, then the heated screw causes the adhered resin to be degraded to cause discoloration. The color-borne resin material is then blended with fresh resin material supplied to implement the following molding process, and is then extruded from the molding machine. As a result, the molded product bears an unwanted color.

On the other hand, when producing molded optical members using injection molding, distortion occurs internally in the molded pieces. Once the distortion internally occurs, it easily causes the molded piece to crack. Any molded product containing internal distortion is not suited for use as an optical member. Furthermore, the injection molding process is not suited for the production of molded resin products having a lengthy and slender configuration or having a special form.

SUMMARY OF THE INVENTION

Therefore, the object of the invention is to provide a novel method o manufacturing thermoplastic resin molded optical members, which can produce quality molded products free from internal distortion and free from unwanted coloring, even when applying high temperatures during the molding operation.

To achieve the above object, the invention provides a novel method of manufacturing a thermoplastic resin molded optical member, such as a preform for optical fibers, wherein the method comprises supplying a selected thermoplastic resin material to the interior of a mold, defoaming the thermoplastic resin material in a vacuum at a specific temperature for causing the thermoplastic resin material to melt and turn into a fluid, and producing a molded member by gradually cooling off the mold in the upward direction beginning from the bottom side while pressurizing an upper surface of the material in a mold with an inert gas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a front view of an example of a mold for executing the method of the invention;

FIG. 2 is a sectional view of the mold shown in FIG. 1;

FIG. 3 schematically shows the structure of an isothermal tub made for use in executing the method of the invention;

FIGS. 4, 6, and 10 respectively show front views of other examples of a mold for executing the method of the invention;

FIGS. 5, 7, and 11 respectively are sectional views of the molds shown in FIGS. 4, 6, and 10;

FIG. 12 schematically shows another example of an isothermal tub for executing the method of the invention;

DETAILED DESCRIPTION OF THE PREFERRED EMBODIMENTS

Figure 4:
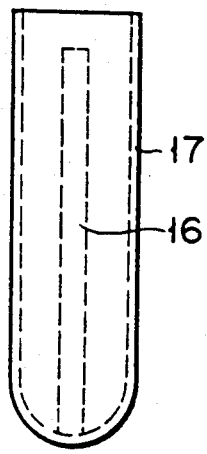

Characteristically, the method of manufacturing a thermoplastic resin molded optical member according to the present invention includes the following. First, the prepared mold is filled with a selected thermoplastic resin material, and then, the resin-loaded mold is installed in an isothermal tub. The mold for use in the present invention substantially comprises a container made from either glass, metal, or silica. Next, the thermoplastic resin material in the isothermal tub is thermally melted and turned into a fluid state. A defoaming process is applied to the thermoplastic resin material by heating the resin material under a vacuum to cause it to flow into the interior of the isothermal tub. Next, the isothermal tub is filled with inert gas to pressurize the upper surface of the resin material in the mold. Next, the interior of the isothermal tub is gradually cooled off in the upward direction from the bottom side. Finally, the mold is taken out of the isothermal tub to obtain a resin-molded optical member.

Either crystalline thermoplastic resin such as polymethylpentene or fluoroplastic, or non-crystalline thermoplastic resin such as polycarbonate, polyarylate or polysulfone may be used for the molding process of the invention. In particular, such a thermoplastic resin that can be thermally molded at a minimum of 200° C. is suited for use in the present invention. If any conventional molding process ever applies more than 200° C. of molding temperature, it results in the occurrence of oxidation and degradation of the resin material. It is desired that the thermoplastic resin used in the invention be free of volatile ingredients because the resin material is degassed in vacuum and molded to the shape of an optical member. Either pellet-form, powder-form, or flake-form thermoplastic resin may be loaded in the mold at normal temperature. Selected thermoplastic resin material melted at the molding temperature or below this temperature may be directly loaded in the mold in the fluid state. It is desired that the fluid resin material be loaded in the mold in vacuo.

The process for defoaming the loaded resin material is executed in an isothermal tub in vacuo. The defoaming process effectively removes impurities such as a monomer from the resin material, and yet, the defoaming process prevents external impurities and foreign substance from mixing into the loaded resin material. In the case of molding optical members, optical characteristic can be prevented from being adversely affected.

When executing the molding process of the present invention, the isothermal tube is filled with inert gas to pressurize the upper surface of the melted resin material in the mold. Either argon gas, or helium gas, or nitrogen gas may be used. Owing to the presence of inert gas in the isothermal tub, not only is there achieved satisfactory molding of the loaded resin material, but the molding system can also prevent the occurrence of extremely fine foam in the molded piece and unwanted space caused by contraction of the molded piece in the course of the cooling process.

It is suggested that the applicable inert gas pressure be defined in a range from 5 to 70 kgf/cm2. If less than 5 kgf/cm2 of pressure were applied, unwanted space is generated in the molded piece. On the other hand, if more than 70 kgf/cm2 of pressure were applied, then inert gas ingredient will mix into the material, and it takes a long time to remove the gas from the molded piece. The suggested pressure range is significantly lower than hundreds of kgf/cm2 which is normally applied in the conventional injection process. In other words, application of the lower pressure than the conventional practice effectively prevents cracks from being generated in the molded product made from fragile or relatively fragile resin material or having a lengthy and slender configuration.

The molded piece in the isothermal tub is gradually cooled off in the upward direction from the bottom side. The cooling process frees the molded piece from distortion in the upward direction from the bottom side. The cooling process is executed by pressurizing the surface of the resin material with inert gas, and as a result, even the molded piece can be molded without producing voids therein.

Next, the molded piece is subjected to a drawing process. It is desired that, in advance of execution of the drawing process, the molded piece be dried in vacuo at a specific temperature below the glass transition point of the molded resin itself. If a gas ingredient is dissolved into the interior of the molded piece, this fully eliminates a gas ingredient. This prevents bubbles from being generated, thus providing a good quality molded product. The drawing process mentioned above is particularly useful when applying the molded piece to an optical member.

It is further desired that the inner surface of the mold be fully coated with a mold releasing agent to permit the cooled product to be easily released from the mold. In particular, either fluoroplastic o ceramic powder may be used as the mold releasing agent. Taking satisfactory smoothness into consideration, and from the view-point of the capability to uniformly cover the inner surface of the mold and to prevent adversely affecting the optical characteristic of the resulting molded product, it is desired that a fluoroplastic soluble in a fluorine carbide solvent such as those fluoroplastic materials containing the main chain consisting of a fluorinated alicyclic group or fluorinated heterocyclic group may be used as the mold-releasing agent. It is further desired that the mold-releasing agent should have a glass transition point higher than the softening point of the molded thermoplastic resin material. It is desired that either fluorinated alicyclic group or fluorinated heterocyclic group be of 5 through 7 saturated cycles. These fluoroplastics are designated in the form of general formulas 1 through 3 shown below, and also in the form of copolymers formed by one or more than one of monomers making up those general formulas 1 through 3 below and other copolymeric monomer containing fluorine.

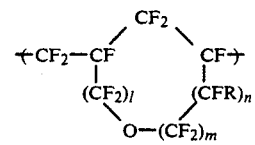

General formula 1 when $l=0-5$, $m=0-4$, $n=0-1$, $l+m+n=1-6$, $R=F$ or $CF_3$.

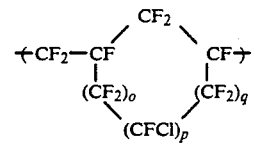

General formula 2 where $o=0-5$, $p=0-5$, $q=0-5$, $o+p+q=1-6$.

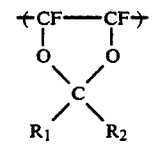

General formula 3 where $R_1=F$ or $CF_3$, $R_2=F$ or $CF_3$.

The fluoroplastics having a cyclic structure on the main chain as shown in general formulas 4 to 9 are representative.

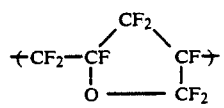

General formula 4

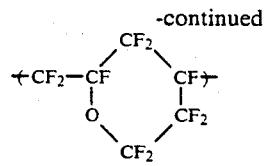

General formula 5

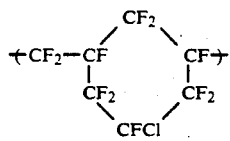

General formula 6

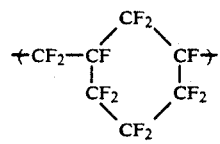

General formula 7

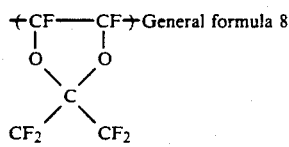

General formula 8

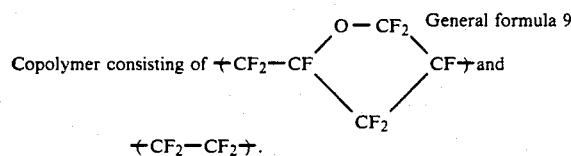

General formula 9

The fluoroplastics comprising those cycles and in chains shown above may be used as mold releasing agent in the present invention. Typically, the following commercially available fluoroplastics are suggested for use as the mold-releasing agent. TEFLON AF-1600 and AF-2400 (a registered trade mark and products of E. I. du Pont de Nemours & Co., Inc.) and CYTOP (a registered trade mark and a product of Asahi Glass Co., Ltd.).

Normally, any of those fluoroplastics is soluble in fluorinated hydrocarbon (CmFm, CmHpFn) which is conventionally called fluoric carbide. Fluoroplastic is dissolved in a solvent such as fluoric carbide for example, and is coated on the inner surface of the mold. Then, the fluoroplastic is coated on the inner surface of the mold by removing the solvent. Since the mold-releasing agent fully coats the inner surface of the mold in the liquid state, unlike the fine-particle mold releasing agent, the inner surface of the mold is perfectly prevented from having a rugged or rough surface texture.

In consequence, when molding resin material into a preform of optical fibers for example, light transmission loss is minimized. Furthermore, since the liquified mold-releasing agent uniformly covers the inner surface of the mold, if the mold were provided with mirror-polished inner surface, then the film of the coated mold-releasing agent also remains in the mirror-polished state, and as a result, the molded piece is also superficially completed with a mirror-polished finish. Furthermore, after fully molding the resin material, any fluoroplastic coated on the surface of the molded piece can easily be removed merely by applying fluoric carbide. Since fluoroplastic is heat-stable, it provides quite a satisfactory releasing effect even after being exposed to a high temperature, and therefore, fluoroplastic is also effectively applicable for use as a releasing agent for such resin materials that should be molded at high a temperature. Furthermore, use of the proper mold releasing agent effectively prevents impurities deposited on the mold from migrating into the moldable resin material. In consequence, the quality of the molded optical member is not adversely affected at all.

When the molded optical member is a preform of plastic optical fibers, the produced preform is subjected to drawing by heating same to a specific temperature above the glass transition point and below the melting point of the molded resin. Thus cores of optical fibers are produced. It is desired that the drawing process be executed at a specific temperature at least 30° C. higher than the glass transition point of the molded resin. This is because the resin material used for the cores of the optical fibers turns white unless the drawing process is executed at a specific temperature at least 30° C. higher than the glass transition point of the molded resin. When the drawing process is performed on the preform, it is desired that the molded resin be dried in vacuo at a specific temperature below the glass transition point of the molded resin before executing the drawing process. This is to remove the gas dissolved in the preform. Thus, the drawing process prevents making foam in the preform.

In order to provide a clad material on the produced fiber optic core, for example, there is such a method which coats the external surface of the core with fluoroplastic dissolved in a fluoric solvent incapable of attacking the core and then removing the solvent. There is also a method of wherein a thermosetting resin is coated on the core using a die and is then hardened. This method may use such fluoroplastic identical to the one that coats the mold during molding of the preform of optical fibers or it may also use any other type of fluoroplastic as well.

EXAMPLE 1

Referring now to the accompanying drawings, the illustrated embodiments of the invention are described below.

First, the present inventors uniformly coated the inner surface of a cylindrical mold 10 having a closed end as shown in FIGS. 1 and 2 with a mold releasing agent. Then the mold releasing agent is dried at ordinary temperature and is dried in the isothermal tub at 120° C. Thus, the mold releasing agent is coated uniformly on the surface. Specifically, the inventors used a mold releasing solution containing 0.5% by weight of TEFLON AF-2400 (a registered trade mark and a product of E. I. du Pont de Nemours & Co., Inc.) dissolved in FLUORINART (a registered trade mark and a product of Sumitomo 3M Co., Ltd.), $C_mF_{m+2}(m=5-8)$, which served as the solvent.

Next, the cylindrical mold 10 was filled with polycarbonate resin PANLITE AD-5503 (a registered trade mark and a product of Teijin Chemical Co., Ltd.), and then the resin-filled mold 10 was loaded in an isothermal tub 11 as shown in FIG. 3. This resin material was preliminarily dried at 120° C. for 120 consecutive hours in vacuo.

The isothermal tub 11 is comprises a tube body 12, a molding chamber 13 inside of the tube body 12, an external cover unit 14 which airtightly seals the molding chamber 13, and a heating/cooling section which is divided into five zones 15a through 15e respectively being provided with heaters H1 through H5 and cooling fans F1 through F5. Supply tubes are connected via the cover unit 14 to a vacuum source (not shown) and to an inert-gas supply source (not shown) by way of interconnecting to the molding chamber 13 via a switchable valve B. The reference characters M, C, and L shown in FIG. 3 respectively designate a pressure gauge, a cold water supply tube set to the lateral walls of the isothermal tub 11, and a leak valve.

Next, the heaters H1 through H5 surrounding the isothermal tub 11 were electrically activated so as to continuously heat the isothermal tub 11 at 250° C. Next, while maintaining the heated condition at 250° C., the switchable valve B was switched to the vacuum source to place the interior of the isothermal tub 11 in a vacuum condition. As a result, the loaded resin material was freed from foam in the vacuum condition which lasted for an hour.

Next, the switchable valve B was switched to the inert-gas supply source, to deliver argon gas to the interior of the isothermal tub 11. Then, applying a 10 kgf/cm2 pneumatic force, the surface of the melted resin material in the mold 10 in the isothermal tub 11 was pressurized for about 10 minutes.

Next, power was disconnected from the bottom heater H1, and simultaneously the bottom fan F1 was activated. After 10 minutes, power was disconnected from the heater H2 right above the bottom heater H1 and simultaneously the second fan F2 was activated. In this way, power was sequentially disconnected power from the remaining heaters and the corresponding fans were activated to sequentially cool off the mold 10 in the upward direction.

After 90 minutes has elapsed, the leak valve L was released to atmospherically level off the internal molding chamber 13 of the isothermal tub 11. Then, the mold 10 was taken out of the isothermal tub 11, and the molded optical member was extracted from the mold 10.

Finally, the inventors evaluated the optical characteristic of the molded optical member. The inventors cut the molded piece to a length of 10 cm, processed both ends with a hot plate, and then checked the light permeability. The complete sample exhibited 86% of light permeability at a wavelength of 660 nm, thus proving a very satisfactory result.

EXAMPLE 2

Figure 5:
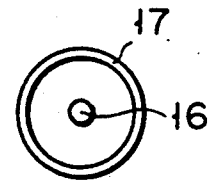

Except for the introduction of a cylindrical mold 17 containing a bar-like lengthy region 16 in the center and a closed end as shown in FIGS. 4 and 5, a cylindrical optical member was produced by executing sequential process steps identical to those which were executed for example 1.

The cylindrical molded optical member thus produced can directly be made available for use as a light wave guide. When preparing a clad of optical fibers with the cylindrical molded optical member, first, the cylindrical member is elongated into a tubular shape. In this case, optical fibers can be produced by initially pouring a thermosetting resin material having a high refractive index into the tube and hardening the resin. Those optical fibers produced from these processes contain an extremely clean inner surface and have a minimum transmission loss factor. In particular, instead of polycarbonate resin, if polymethylpentene or ethylene-tetrafluoroethylene copolymer and tetrafluoroethylene is used as a resin material, the thermosetting resin available for use as the core material is easily selected from the viewpoint of the refractive index.

EXAMPLE 3

Figure 6:
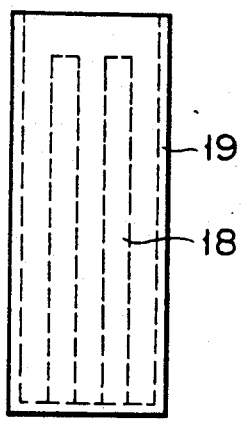
Figure 7:
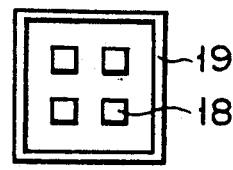
Figure 8:
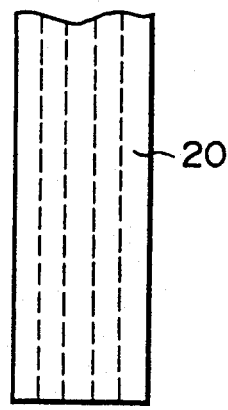
FIG. 8 schematically shows a molded optical member produced from the mold shown in FIG. 6.
Figure 9:
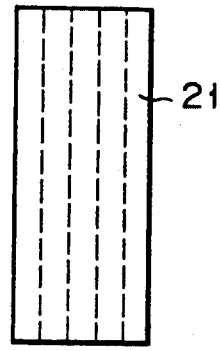
FIG. 9 schematically shows a light wave guide produced by applying the molded optical member shown in FIG. 8.

Except for the introduction of a square prism mold 19 containing four bar-like members 18 each having a square cross section as shown in FIGS. 6 and 7, in the same way as was done for example 1, a square prism optical member 20 containing four square holes as shown in FIG. 8 was produced. As shown in FIG. 9, the square prism optical member 20 can easily be converted into a light wave guide 21 by initially cutting off both ends and then optically polishing the cut ends.

EXAMPLE 4

Except for the introduction of POLYARYLATE P-5001 (a registered trade mark and a product of Unitika Co., Ltd.) in place of polycarbonate resin and the raising of the internal temperature of the isothermal tub 11 to 310° C., in the same way as was done for example 1, a molded optical member was produced.

After measuring the light permeability of the molded optical member in the same way as was done for example 1, it was confirmed that the molded optical member exhibited 70% of light permeability at a wavelength of 660 nm, thus providing a satisfactory result.

EXAMPLE 5

Except for the introduction of POLYETHERSULFON (a registered trade mark and a product of Mitsui To-atsu Chemical Co., Ltd.) in place of polycarbonate resin and the raising of the internal temperature of the isothermal tub 11 to 330° C., in the same way as was done for example 1, a molded optical member was produced. The molded optical member has quite satisfactory shape and exhibited satisfactory optical characteristics.

EXAMPLE 6

First, the present inventors prepared a cylindrical mold 23 containing a bar-like member 22 in the center as shown in FIGS. 10 and 11, and then coated the inner surface with a selected mold-releasing agent identical to the one used for example 1, and then fully dried the coated inner surface of the cylindrical mold 23. Next, the inventors loaded the cylindrical mold 23 in an isothermal tub 25 shown in FIG. 12. FIG. 12 schematically shows the isothermal tub 25. Those components identical to those shown in FIG. 3 are respectively designated by the identical reference numerals and characters, and thus, description of these components is deleted here.

The isothermal tub 25 contains a funnel 26 which interconnects to the upper aperture 23a of the mold 23. A heater 2 is installed so as to surround the external surface of the isothermal tub 25.

The cylindrical mold 23 was filled with flake-form polycarbonate resin PANLITE L-1225 (a registered trade mark and a product of Teijin Chemical Co., Ltd.) through the funnel 26. Next, the interior of the isothermal tub 25 was heated to 260° C. by activating the heater 27, and then the switchable valve B was turned to the vacuum source. The vacuum condition was maintained for 3 hours to defoam the resin material preliminarily dried at 120° C. for 120 hours.

After fully defoaming the loaded resin material, the switchable valve B was switched to the inert-gas supply source, and argon gas was fed into the isothermal tub 25. Next, the upper surface of melted resin material was pressurized in the mold 23 inside of the isothermal tube for about 10 minutes by applying 10 kgf/cm2 of pressure. Next, the heater 27 was removed, and then respective regions covered by the heater 27 were sequentially cooled off in the upward direction from the bottom side by bringing the regions of the tub 25 into contact with water.

Figure 13:
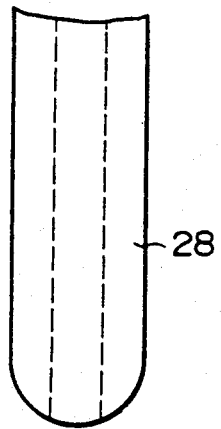
FIG. 13 schematically shows a molded optical member produced from the mold shown in FIG. 10.
Figure 14:
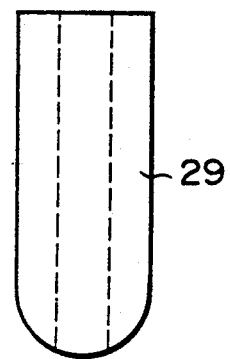
FIG. 14 schematically shows a light wave guide produced by applying the optical member shown in FIG. 13.

Next, the leak valve L was released to atmospherically level off the interior of the isothermal tub 25, and then the cylindrical mold 23 was taken out of the isothermal tub 25. As a result, a molded optical member 28 shown in FIG. 13 was yielded from the cylindrical mold 23. Next, an end of the molded optical member 28 of FIG. 13 was cut off to produce the product shown in FIG. 14, which was then optically polished at both ends. In consequence, the present inventors produced a quite satisfactory light wave guide 29.

The molded optical member 28 was then dried in vacuum a condition while keeping the molded member 28 at a temperature below the glass transition point, and then it was elongated while keeping it at 260° C. Finally, the present inventors produced a clad available for optical fibers. It was confirmed that the optical fibers using the novel clad exhibited a quite satisfactory optical characteristic.

COMPARATIVE EXAMPLE 1

Figure 15:
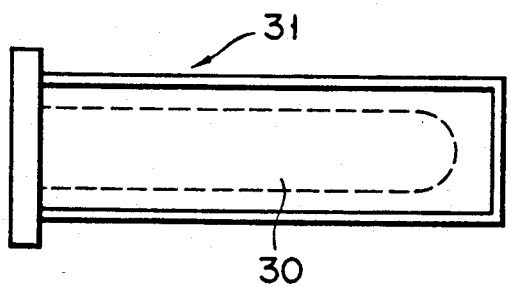
FIG. 15 schematically shows a mold for manufacturing a molded optical member by applying a conventional injection molding operation.

Using polycarbonate resin (PANLITE AD-5503, a product of Teijin Chemical Co., Ltd.), the present inventors executed a trial molding process by injecting the resin material into a mold 31 containing cavity 30 shown in FIG. 15 by using an injection molding machine having an inner diameter of 65 mm. The inner surface of the mold 31 was preliminarily coated with silicone oil serving as mold-releasing agent and then the mold 31 was heated to 250° C. After completing the molding process, the mold 31 was cooled off and then a molded optical member was extracted from the mold.

After measuring the light permeability of the molded optical member in the same way as was done for example 1, it was confirmed that the molded optical member merely exhibited 58% of light permeability at a wavelength of 660 nm. Also, one of four molded optical members cracked.

COMPARATIVE EXAMPLE 2

Except for the introduction of ceramic powder as the mold releasing agent in place of silicone oil and a molding temperature of 260° C., in the same way as was done for comparative example 1, five units of an optical member were molded.

After evaluating the light permeability of these molded optical members, in the same way as was done for example 1, despite a light permeability rated to be 63% at a wavelength of 660 nm, it was confirmed that four out of the five molded optical members cracked. Thus, the surface of molded optical members cannot maintain the desired optical condition.

As is clear from the above description, since the method of the invention effectively defoams fluid thermoplastic resin material loaded in the mold in vacuo, no space can remain in the resin material, and moreover, since the fluid thermoplastic resin material is molded by means of a pressurized inert gas, even a slightest pin hole cannot be generated in the molded member. Furthermore, since distortion is effectively released by sequentially cooling off the heated mold in the upward direction from the bottom side, the molding system of the invention can securely and stably produce high quality optical members.

Additional advantages and modifications will readily occur to those skilled in the art. Therefore, the invention in its broader aspects is not limited to the specific details and illustrated examples shown and described herein. Accordingly, various modifications may be made without departing from the spirit or scope of the general inventive concept as defined by the appended claims and their equivalents.

What is claimed is:

1. A method of manufacturing a thermoplastic resin molded optical member, comprising the steps of;
   feeding thermoplastic resin material into a mold;
   defoaming said thermoplastic resin material under a vacuum at a temperature causing said thermoplastic resin material to melt and turn into a fluid; and
   producing a molded member by gradually cooling off said mold in the upward direction from a bottom side of said mold while pressurizing an upper surface of the material in said mold with an inert gas.

2. A method of manufacturing a thermoplastic resin molded optical member according to claim 1, further comprising a step of preliminarily coating an inner surface of said mold with a fluoroplastic containing one of a fluorinated alicyclic group and a fluorinated heterocyclic group in the main chain.

3. A method of manufacturing a thermoplastic resin molded optical member according to claim 2, wherein said fluoroplastic contains a specific glass transition higher than the softening point of said thermoplastic resin material.

4. A method of manufacturing a thermoplastic resin molded optical member according to claim 2, wherein the inner surface of said mold is preliminarily coated with said fluoroplastic dissolved in a solvent in the form of a solution and is then dried.

5. A method of manufacturing a thermoplastic resin molded optical member according to claim 4, wherein said solvent comprises $C_mF_{m+2}$ (m=5-8).

6. A method of manufacturing a preform member for an optical fiber, comprising the steps of:
   feeding a thermoplastic resin material into a mold;
   defoaming said thermoplastic resin material under a vacuum at a temperature for causing said thermoplastic resin material to melt and turn into a fluid; and
   producing a molded preform member by gradually cooling off said mold in the upward direction from a bottom side of said mold while pressurizing an upper surface of the material in said mold with an inert gas.

7. A method of manufacturing a thermoplastic resin molded optical member, comprising the steps of:
   feeding thermoplastic resin material into a mold;
   defoaming said thermoplastic resin material under a vacuum at a temperature causing said thermoplastic resin material to melt and turn into a flowing material;
   producing a preform available for forming an optical fiber by gradually cooling off said mold in the upward direction from a bottom side of said mold while applying pressure to an upper surface of the material in said mold with an inert gas; and
   performing a drawing of said produced preform to complete forming of said optical fiber.

8. A method of manufacturing a thermoplastic resin molded optical member according to claim 7, further comprising a step of drying said preform under a vacuum at a specific temperature below the glass transition point of said thermoplastic resin before execution of said drawing step.

* * * * *